WERNER G. HUEBER
KLAUS J. HECKER
INVENTORS

BY

ATTORNEY

United States Patent Office
3,435,140
Patented Mar. 25, 1969

3,435,140
ADAPTIVE CONTROL SYSTEM FOR AIRBORNE
TELEVISION CAMERA
Werner G. Hueber, Riverside, Calif., and Klaus J. Hecker, Oberursel, Germany, assignors to the United States of America as represented by the Secretary of the Navy
Filed Nov. 24, 1965, Ser. No. 510,164
Int. Cl. H01j 29/02; B64c 13/50
U.S. Cl. 178—7.81                    9 Claims The invention herein described may be manufactured and used by or for the Government of the United States of America for governmental purposes without the payment of any royalties thereon or therefor.

The present invention is related to electro-optical guidance systems and more particularly to a system for automatic adaption of an airborne television camera to its most effective control system.

This invention is related to copending U.S. patent application Ser. No. 510,167, filed Nov. 24, 1965, for Target Area Sequential Correlator.

Several different types of control for an airborne television camera are known: the simplest type is position control, where the position of the camera axis is related to the position of a control stick used by the human operator; another type is a rate-controlled system, where the rate of motion of the camera axis is controlled by the position of the control stick; and still another type is acceleration control, where the angular acceleration of the camera axis is controlled by the control stick position. Since in different phases of operation of an airborne camera different requirements exist, one could employ switching means to provide different types of control as necessary. However, such a system would require that a human operator manipulate an additional control, adding to the complexity of operation of the system.

The present control system for an airborne television camera will permit effective control of the direction of the axis of a television camera with respect to the axis of a moving airborne platform (such as an aircraft) during the phases of navigation, target acquisition and identification or during different types of operations, and in addition, smooth transition to other modes of operation, such as target tracking, automatic target detection, etc., is assured. The output signal of a control stick operated by a human operator is fed to a subsystem, a control stick motion sensor, which determines whether rate or acceleration control of the camera should be used.

It is an object of the invention to provide a system for permitting automatic adaption of an airborne television camera to its most effective control system.

Another object of the invention is to provide an adaptive control system for an airborne television camera.

A further object of the invention is to provide a system for smooth transition from manual to automatic operation in electro-optical guidance systems.

Other objects and many of the attendant advantages of this invention will become readily appreciated as the same becomes better understood by reference to the following detailed description when considered in connection with the accompanying drawings wherein:

FIG. 1 of drawing is a system block diagram of one embodiment of the instant invention.

Figure 1:
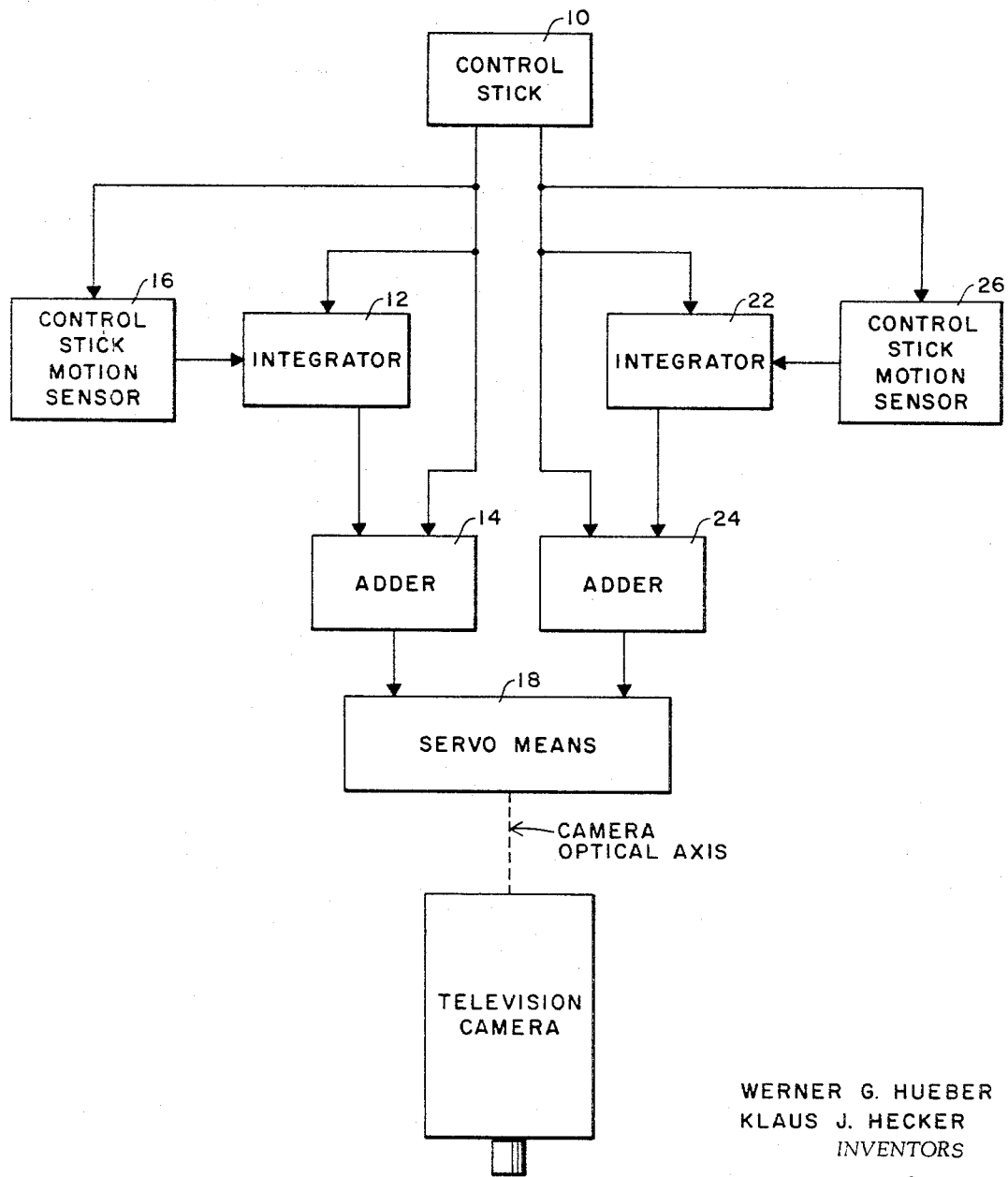

The system of the present invention makes use of adaptive techniques to adapt itself to the particular requirements at any instant. A block diagram of an embodiment of such system is shown in FIG. 1. As shown, the output signals from the control stick 10 in pitch and yaw are each fed to three different circuits. Pitch signals are fed: to an integrator circuit 12, typically an operational amplifier with capacitor feedback; to an adding circuit 14 which also receives the output signal from integrator 12; and to a circuit 16 identified as a control stick motion sensor whose output serves to discharge integrator 12. The output of adding circuit 14 is fed to appropriate servo means 18. The yaw signals likewise are fed: to an integrator circuit 22; to an adding circuit 24 which also receives the output from integrator 22; and to control stick motion sensor circuit 26 whose output serves to discharge integrator 22. The output of adding circuit 24 is also fed to servo means 18. Servo means 18 in turn controls the rate of change of the camera axis angles. The control stick motion sensors 16 and 26 each consist simply of the combination of a differentiator circuit, a two-way rectifier circuit, and a threshold circuit connected in series and adjusted in such a way that a change of the input signal will cause an output from the differentiator circuit, which is uni-polarized in the two-way rectifier circuit; if the magnitude and rate of change at the input exceed certain levels, the output of the two-way rectifier will exceed the triggering level of the threshold circuit and a signal will appear at the outputs and cause discharge of the integrators 12 and 22.

When the television camera is used for general search and/or navigation, it is typically moved through rather large angles in both pitch and yaw; to accomplish this, the human operator will almost continuously be moving the control stick back and forth, resulting in rather rapid changes of the output signals of the control stick 10. These changes will exceed the threshold of the control stick motion sensor 16 and/or 26 most of the time, resulting in an almost continuous discharge of the respective integrators 12 and 22 which therefore are not accumulating any charge and do not provide a signal to respective adding circuits 14 and 24. If the human operator would release the control stick at this instant, the camera axis would not move with respect to the aircraft axis; any point on the ground shown on the television display would gradually move out of the field-of-view of the camera, because the aircraft is moving with respect to the ground (unless the aircraft is directly flying towards this point). When the human operator sees any point on his display which he may want to keep in his field of view for further investigation, he will not move control stick 10 by any large amount, resulting in a fairly constant output signal. The changes of this signal are not sufficient to trigger control stick motion sensors 16 and 26, and consequently integrators 12 and 22 will start accumulating charges that will result in outputs to adding circuits 14 and 24. These signals will cause a higher rate of change of the camera axis, which will be offset by the operator by a slight change in the control stick 10 position. This process will continue until control stick 10 is at its ZERO-position and the rate-of-change signal is supplied by integrators 12 and 22. Since the rate of change required to keep the point in the field-of-view will vary slowly, as the aircraft changes its position, the operator will move control stick 10 slightly to correct for this change. While a certain amount of rate control from the control stick is still retained, the camera axis is now basically controlled in acceleration. When the human operator wishes to move the camera axis by a larger amount, the integrators 12 and 22 are discharged and rate control of the camera is reestablished.

This system will permit automatic adaptation of an airborne television camera to its most effective control system. In addition, since the signal supplied by the control stick during the acceleration mode is very small, smooth transition from manual to automatic control (such as achieved by automatic target tracking) is possible (an automatic tracker will typically provide no output signal at the start of its operation).

Figure 4:
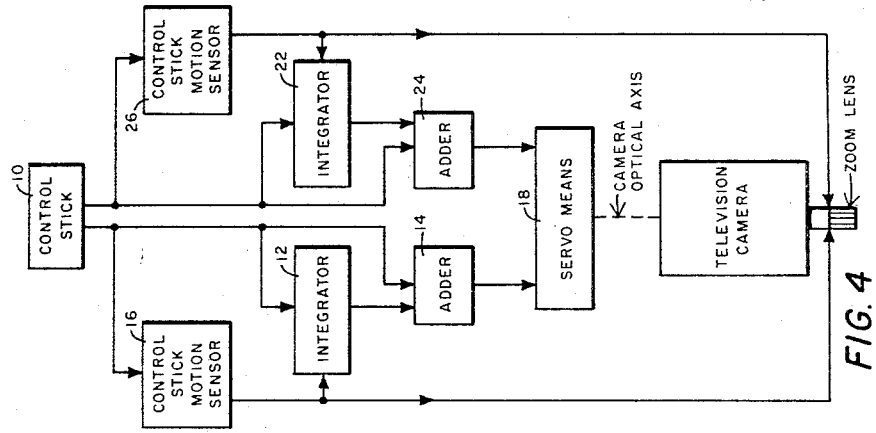
FIG. 4 is still another embodiment of the invention with zoom lens control.
Figure 3:
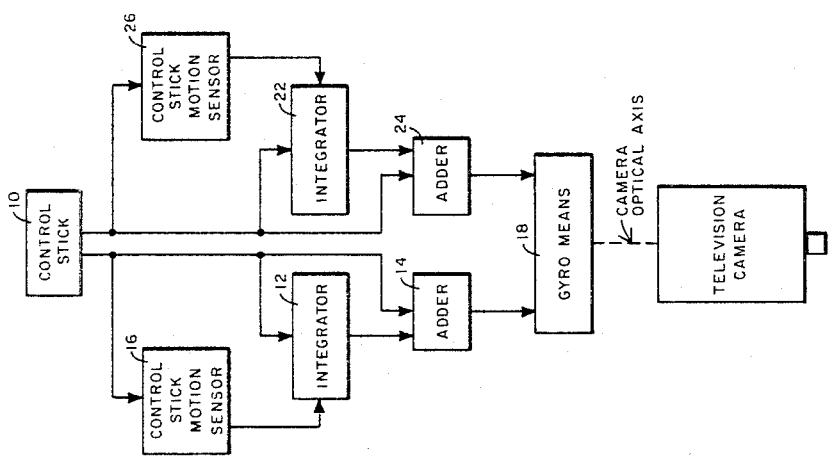
FIG. 3 is a further embodiment using gyro means for camera axis control.
Figure 2:
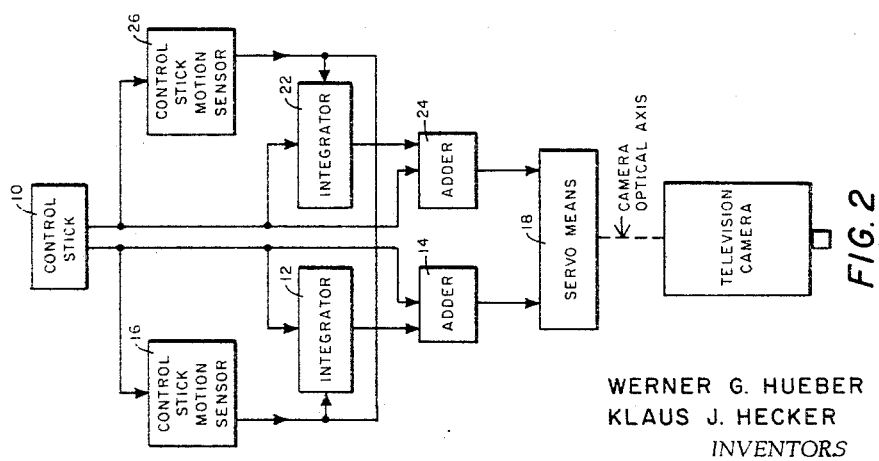
FIG. 2 is another embodiment of the invention.

In an alternate system, shown in FIG. 2, the outputs of both control stick motion sensors for pitch and yaw are combined and fed to the integrators for pitch and yaw, resulting in both channels being in the same mode during all phases of operation. In another alternate system, the output of the adding circuits 14 and 24 are fed to torquers of a gyro, instead of servo 18, which in turn controls the direction of the camera axis, as shown in FIG. 3. This system is rather insensitive to sudden changes of aircraft attitude. In still another alternate system, shown in FIG. 4, the control of a zoom lens in the television camera is switched by the outputs of the control stick motion sensors (which also control the integrator discharge) in such a way that the field-of-view is automatically decreasing when the output changes of the control stick do not exceed the threshold of the control stick motion sensor and is automatically increasing when it is exceeding the threshold.

Obviously many modifications and variations of the present invention are possible in the light of the above teachings. It is therefore to be understood that within the scope of the appended claims the invention may be practiced otherwise than as specifically described.

What is claimed is:

1. An adaptive control system for airborne electro-optical guidance systems which allows effective control of the direction of the optical axis during different types of operation, comprising:
   (a) a control stick means which provides output signals in pitch and in yaw,
   (b) separate pitch and yaw channels,
   (c) each separate said pitch channel and said yaw channel including an integrator means, an adding circuit means, and a control stick motion sensor means,
   (d) output signals in pitch being fed to said integrator means, said adding circuit means and said control stick motion sensor means in the pitch channel,
   (e) output signals in yaw being fed to said integrator means, said adding circuit means and said control stick motion sensor means in the yaw channel,
   (f) the outputs of said pitch channel control stick motion sensor means and said yaw channel control stick motion sensor means being fed to said integrator means in their respective channels, the outputs of each said control stick motion sensor means being used to cause discharge of respective said integrator means,
   (g) the output of said integrator means being fed to respective said adding circuit means,
   (h) camera means having an optical axis,
   (i) a servo means being connected to said camera means for controlling the movement of the camera axis,
   (j) the output of both the pitch channel adding circuit means and the yaw channel adding circuit means being fed to said servo means for controlling said camera axis.

2. A system as in claim 1 wherein each said control stick motion sensor means consist of a differentiator circuit, a two-way rectifier circuit, and a threshold circuit connected in series and adjusted so that a change of input signal to the control stick motion sensor means will cause an output from the differentiator circuit that is unipolarized in the two-way rectifier circuit; and when the magnitude and rate of change of the signal at the input to said control stick motion sensor means exceed certain levels, the output of the two-way rectifier will exceed the triggering level of the threshold circuit and a signal will appear at the outputs which is fed to said integrator means for causing discharge thereof.

3. A system as in claim 1 wherein the television camera includes a zoom lens and control means therefor, and the output signals from each said control stick motion sensor means are also fed to said zoom lens control means for causing the field-of-view to automatically decrease when the output changes from said control stick means do not exceed the threshold of the control stick motion sensor and to increase when the output changes exceed the threshold.

4. An adaptive control system for airborne electro-optical guidance systems which allows effective control of the direction of the optical axis during different type of operation, comprising:
   (a) a control stick means which provides output signals in pitch and in yaw,
   (b) separate pitch and yaw channels,
   (c) each separate said pitch channel and said yaw channel including an integrator means, an adding circuit means, and a control stick motion sensor means,
   (d) output signals in pitch being fed to said integrator means, said adding circuit means and said control stick motion sensor means in the pitch channel,
   (e) output signals in yaw being fed to said integrator means, said adding circuit means and said control stick motion sensor means in the yaw channel,
   (f) the outputs of said pitch channel control stick motion sensor means and said yaw channel control stick motion sensor means being fed to said integrator means in their respective channels, the outputs of each said control stick motion sensor means being used to cause discharge of respective said integrator means,
   (g) the output of said integrator means being fed to respective said adding circuit means,
   (h) camera means having an optical axis,
   (i) a gyro means being connected to said camera means for controlling the movement of the camera axis,
   (j) the output of both the pitch channel adding circuit means and the yaw channel adding circuit means being fed to said gyro means for controlling said camera axis.

5. A system as in claim 4 wherein each said control stick motion sensor means consist of a differentiator circuit, a two-way rectifier circuit, and a threshold circuit connected in series and adjusted so that a change of input signal to the control stick motion sensor means will cause an output from the differentiator circuit that is unipolarized in the two-way rectifier circuit; and when the magnitude and rate of change of the signal at the input to said control stick motion sensor means exceed certain levels, the output of the two-way rectifier will exceed the triggering level of the threshold circuit and a signal will appear at the outputs which is fed to said integrator means for causing discharge thereof.

6. A system as in claim 4 wherein the television camera includes a zoom lens and control means therefor, and the output signals from each said control stick motion sensor means are also fed to said zoom lens control means for causing the field-of-view to automatically decrease when the output changes from said control stick means do not exceed the threshold of the control stick motion sensor and to increase when the output changes exceed the threshold.

7. An adaptive control system for airborne electro-optical guidance systems which allows effective control of the direction of the optical axis during different types of operation, comprising:
   (a) a control stick means which provides output signals in pitch and in yaw,
   (b) separate pitch and yaw channels,
   (c) each separate said pitch channel and said yaw channel including an integrator means, an adding circuit means, and a control stick motion sensor means,
   (d) output signals in pitch being fed to said integrator means, said adding circuit means and said control stick motion sensor means in the pitch channel,
(e) output signals in yaw being fed to said integrator means, said adding circuit means and said control stick motion sensor means in the yaw channel,
(f) the outputs of both the pitch and yaw control stick motion sensor means being combined and fed to both the pitch and yaw integrator means, the outputs of each said control stick motion sensor means being used to cause discharge of said integration means.
(g) the output of said integrator means being fed to respective said adding circuit means,
(h) camera means having an optical axis,
(i) a servo means being connected to said camera means for controlling the movement of the camera axis,
(j) the output of both the pitch channel adding circuit means and the yaw channel adding circuit means being fed to said servo means for controlling said camera axis.

8. A system as in claim 7 wherein each said control stick motion sensor means consist of a differentiator circuit, a two-way rectifier circuit, and a threshold circuit connected in series and adjusted so that a change of input signal to the control stick motion sensor means will cause an output from the differentiator circuit that is unipolarized in the two-way rectifier circuit; and when the magnitude and rate of change of the signal at the input to said control stick motion sensor means exceed certain levels, the output of the two-way rectifier will exceed the triggering level of the threshold circuit and a signal will appear at the outputs which is fed to said integrator means for causing discharge thereof.

9. A system as in claim 7 wherein the television camera includes a zoom lens and control means therefor, and the output signals from each said control stick motion sensor means are also fed to said zoom lens control means for causing the field-of-view to automatically decrease when the output changes from said control stick means do not exceed the threshold of the control stick motion sensor and to increase when the output changes exceed the threshold.

References Cited
UNITED STATES PATENTS

| | | | |
|---|---|---|---|
| 2,977,070 | 3/1961 | Burner | 244—775 |
| 3,137,459 | 6/1964 | Smith et al. | 244—775 |
| 3,201,675 | 8/1965 | Curran et al. | 244—775 |

RALPH D. BLAKESLEE, *Primary Examiner.*

B. LEIBOWITZ, *Assistant Examiner.*

U.S. Cl. X.R.

244—77